(12) United States Patent
Hafeznezami

(10) Patent No.: US 11,977,276 B2
(45) Date of Patent: May 7, 2024

(54) SURFACE WIPING ASSEMBLY

(71) Applicant: Cozy Lines, Inc., Cumming, GA (US)

(72) Inventor: Mohammad Hadi Hafeznezami, Cumming, GA (US)

(73) Assignee: Cozy Lines, Inc., Cumming, GA (US)

( * ) Notice: Subject to any disclaimer, the term of this patent is extended or adjusted under 35 U.S.C. 154(b) by 0 days.

(21) Appl. No.: 17/712,117

(22) Filed: Apr. 2, 2022

(65) Prior Publication Data

US 2023/0314844 A1 Oct. 5, 2023

(51) Int. Cl.
*G02C 13/00* (2006.01)
*B08B 1/00* (2006.01)

(52) U.S. Cl.
CPC ............ *G02C 13/006* (2013.01); *B08B 1/006* (2013.01)

(58) Field of Classification Search
CPC ...... G02C 13/00; G02C 13/006; B08B 1/006; B08B 7/0028; A47L 4/02; A47L 13/18; A47L 25/00; A41D 13/087; A41D 2400/72; A46B 5/04

USPC ...... 15/208, 209.1, 210.1, 214, 218, 104.94, 15/220.2; 401/9, 10
See application file for complete search history.

(56) References Cited

U.S. PATENT DOCUMENTS

| 2,908,923 | A | * | 10/1959 | Schlechter | G02C 13/006 |
| | | | | | 24/561 |
| 2009/0013441 | A1 | * | 1/2009 | Duffy | A41D 13/087 |
| | | | | | 2/21 |
| 2013/0025016 | A1 | * | 1/2013 | Koffi | G06F 3/044 |
| | | | | | 2/21 |
| 2015/0029153 | A1 | * | 1/2015 | Williams | B31D 1/026 |
| | | | | | 345/174 |

* cited by examiner

*Primary Examiner* — Katina N. Henson
(74) *Attorney, Agent, or Firm* — Ballard Spahr LLP

(57) ABSTRACT

An apparatus for cleaning surfaces can include a wiping assembly. The wiping assembly can have a pair of wiping elements, each wiping element having a wiping surface and an opposed gripping surface. The pair of wiping elements can be arranged with the respective wiping surfaces opposing each other. The wiping assembly can further include a coupling element having opposed longitudinal ends. Each longitudinal end of the coupling element can be coupled to a respective wiping element of the pair of wiping elements.

18 Claims, 4 Drawing Sheets

SURFACE WIPING ASSEMBLY

FIELD

This disclosure generally relates to apparatuses for wiping surfaces such as eyeglass lenses and touchscreen displays, and methods of use of said apparatuses.

BACKGROUND

Eyewear such as eyeglasses and sunglasses are difficult to keep clean. The eyewear routinely become soiled with dirt, oil, wax, etc. For example, the eyewear can get soiled with fingerprints from handling. Microfiber wipes can often be insufficient to remove certain material deposits such as oil or wax. For such material deposits, liquid cleaners can be used. However, such liquid cleaners are typically stored and carried in large, cumbersome spray bottles. Thus, these cumbersome spray bottles must be lugged around in, for example, a purse or handbag, in case the liquid cleaner is needed. It is therefore common that situations arise in which the liquid cleaner is not available.

Similar situations arise in which other surfaces, such as for example, smartphone touchscreens, require cleaning, yet convenient cleaning apparatuses are not available.

Accordingly, a convenient, portable surface-cleaning wipe is desirable.

SUMMARY

Described herein, in various aspects, is an apparatus comprising a wiping assembly. The wiping assembly can comprise a pair of wiping elements, each wiping element having a wiping surface and an opposed gripping surface. The pair of wiping elements can be arranged with the respective wiping surfaces opposing each other. Each wiping element can have an outer perimeter. At least one tab can be coupled to each wiping element of the pair of wiping elements. The at least one tab can extend outwardly from the outer perimeter of each of the wiping elements.

In some optional aspects, the at least one tab can comprise a coupling element having opposed longitudinal ends. Each longitudinal end of the coupling element can be coupled to a respective wiping element of the pair of wiping elements.

Additional advantages of the invention will be set forth in part in the description that follows, and in part will be obvious from the description, or may be learned by practice of the invention. The advantages of the invention will be realized and attained by means of the elements and combinations particularly pointed out in the appended claims. It is to be understood that both the foregoing general description and the following detailed description are exemplary and explanatory only and are not restrictive of the invention, as claimed.

DESCRIPTION OF THE DRAWINGS

These and other features of the preferred embodiments of the invention will become more apparent in the detailed description in which reference is made to the appended drawings wherein.

DETAILED DESCRIPTION

Figure 1:
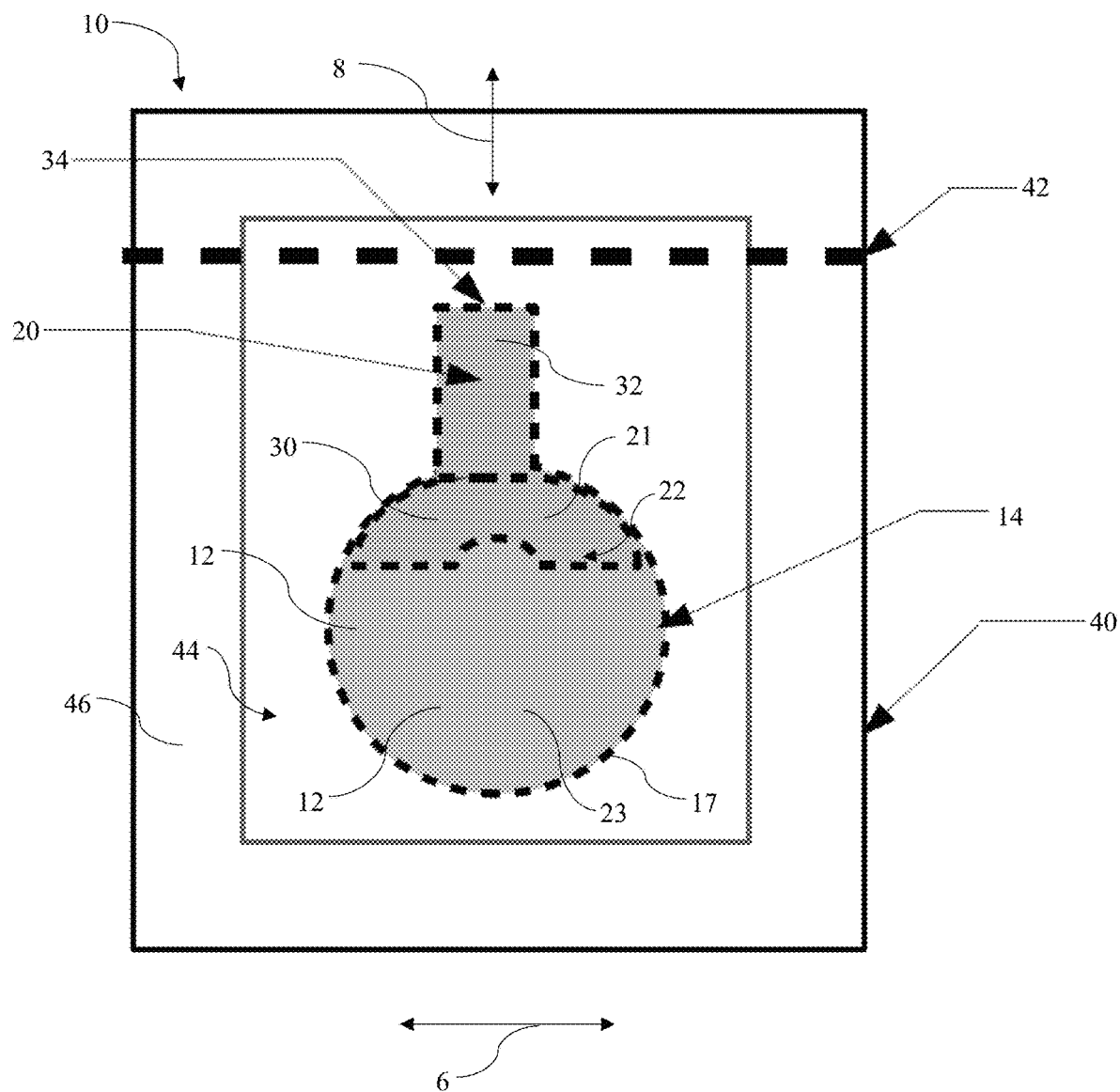
FIG. 1 is a side view of an apparatus comprising a wiping assembly stored within packaging.

The present invention now will be described more fully hereinafter with reference to the accompanying drawings, in which some, but not all embodiments of the invention are shown. Indeed, this invention may be embodied in many different forms and should not be construed as limited to the embodiments set forth herein; rather, these embodiments are provided so that this disclosure will satisfy applicable legal requirements. Like numbers refer to like elements throughout. It is to be understood that this invention is not limited to the particular methodology and protocols described, as such may vary. It is also to be understood that the terminology used herein is for the purpose of describing particular embodiments only, and is not intended to limit the scope of the present invention.

Many modifications and other embodiments of the invention set forth herein will come to mind to one skilled in the art to which the invention pertains having the benefit of the teachings presented in the foregoing description and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

As used herein the singular forms "a," "an," and "the" include plural referents unless the context clearly dictates otherwise. For example, use of the term "a wiping element" can refer to one or more of such wiping elements, and so forth.

All technical and scientific terms used herein have the same meaning as commonly understood to one of ordinary skill in the art to which this invention belongs unless clearly indicated otherwise.

As used herein, the terms "optional" or "optionally" mean that the subsequently described event or circumstance may or may not occur, and that the description includes instances where said event or circumstance occurs and instances where it does not.

As used herein, the term "at least one of" is intended to be synonymous with "one or more of." For example, "at least one of A, B and C" explicitly includes only A, only B, only C, and combinations of each.

Ranges can be expressed herein as from "about" one particular value, and/or to "about" another particular value. When such a range is expressed, another aspect includes from the one particular value and/or to the other particular value. Similarly, when values are expressed as approximations, by use of the antecedent "about," it will be understood that the particular value forms another aspect. It will be further understood that the endpoints of each of the ranges are significant both in relation to the other endpoint, and independently of the other endpoint. Optionally, in some aspects, when values are approximated by use of the antecedent "about," it is contemplated that values within up to 15%, up to 10%, up to 5%, or up to 1% (above or below) of the particularly stated value can be included within the scope of those aspects. Similarly, use of the antecedent "generally" (e.g., "generally circular") can indicate variances of up to 15%, up to 10%, up to 5%, or up to 1%.

The word "or" as used herein means any one member of a particular list and also includes any combination of members of that list.

It is to be understood that unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is in no way intended that an order be inferred, in any respect. This holds for any possible non-express basis for interpretation, including: matters of logic with respect to arrangement of steps or operational flow; plain meaning derived from grammatical organization or punctuation; and the number or type of aspects described in the specification.

The following description supplies specific details in order to provide a thorough understanding. Nevertheless, the skilled artisan would understand that the apparatus, system, and associated methods of using the apparatus can be implemented and used without employing these specific details. Indeed, the apparatus, system, and associated methods can be placed into practice by modifying the illustrated apparatus, system, and associated methods and can be used in conjunction with any other apparatus and techniques conventionally used in the industry.

Figure 2:
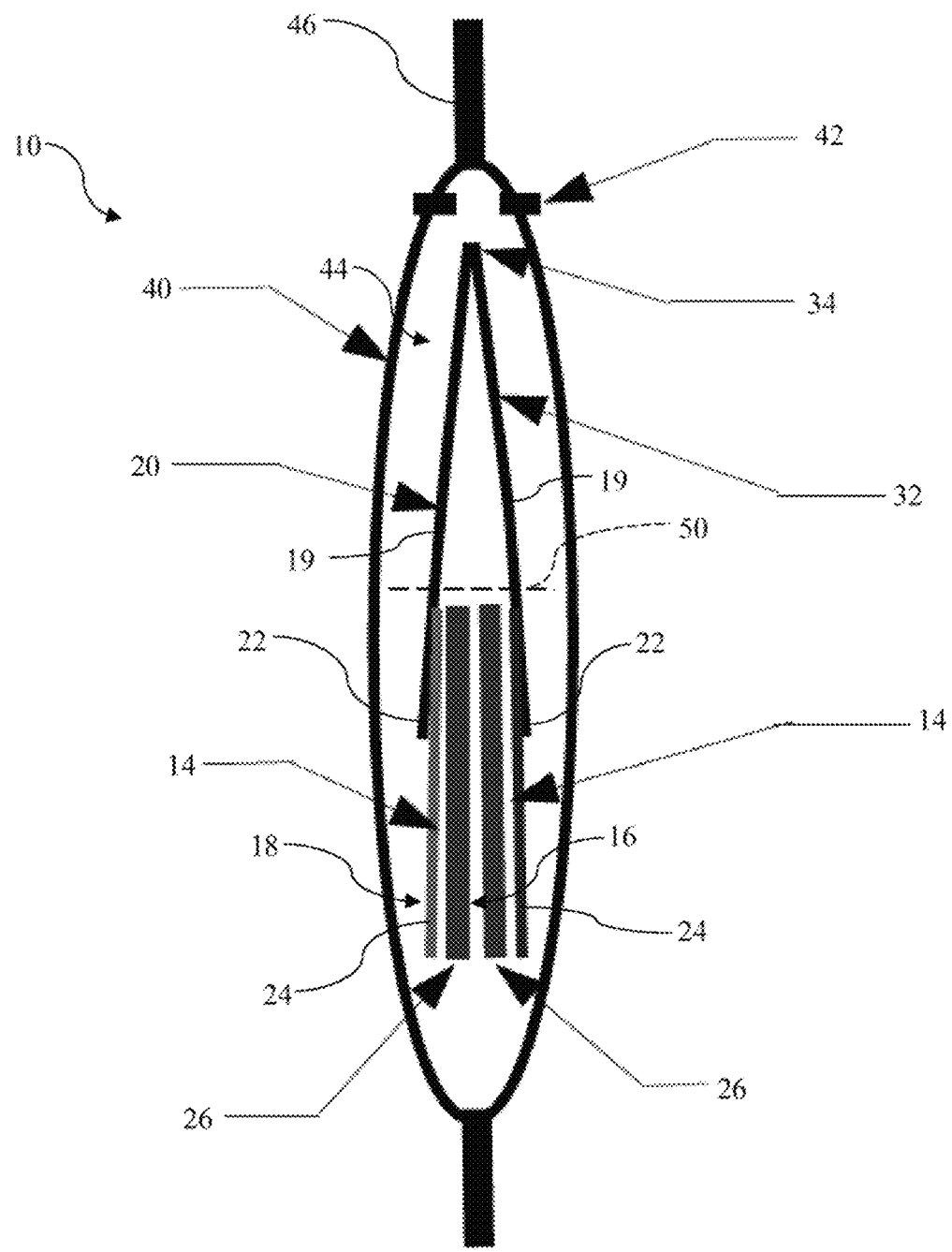
FIG. 2 is a cross sectional view of the apparatus of FIG. 1.

Disclosed herein, in various aspects and with reference to FIGS. 1-2, is an apparatus 10 comprising a wiping assembly 12. The wiping assembly 12 can comprise a pair of wiping elements 14. Each wiping element 14 can have a wiping surface 16 and an opposed gripping surface 18. The pair of wiping elements 14 can be arranged with the respective wiping surfaces 16 opposing each other.

The wiping elements 14 can have an outer perimeter 17. The wiping assembly 12 can further comprise at least one tab 19 that extends outwardly from the outer perimeter 17 of the wiping elements 14. The at least one tab 19 can serve as a grip for holding the wiping elements in a first hand of the user while positioning the fingers of the second hand of the user on the wiping elements 14, as further described herein. In some aspects, the at least one tab 19 covers only a first portion 21 of the gripping surface of each wiping element of the pair of wiping elements so that a second portion 23 of the gripping surface of each wiping element is exposed for adhering to a finger of a user.

Optionally, the at least one tab 19 can be embodied as a coupling element 20 that couples the pair of wiping elements 14 to each other. The coupling element 20 can have opposed longitudinal ends 22. Each longitudinal end 22 can be coupled to a respective wiping element 14. In alternative aspects, each wiping element can couple to a respective separate tab 19 that is not coupled to other wiping elements.

In exemplary aspects, the pair of wiping elements 14 can be pre-moistened. For example, the pair of wiping elements can be pre-moistened with a solution. In some aspects, the solution can comprise a surfactant (e.g., sodium lauryl sulfate). In further aspects, the solution can comprise an alcohol and/or ammonia. In various aspects, the solution can comprise a lens cleaning solution. For example, in some aspects, the lens cleaning solution can comprise alcohol (e.g., ethyl alcohol), ammonium hydroxide, and a surfactant (e.g., sodium lauryl sulfate). In some optional aspects, the solution can comprise an anti-fogging agent.

In some exemplary, optional aspects, the pair of wiping elements 14 can comprise microfiber cloth. In further aspects, the pair of wiping elements 14 can comprise paper (e.g., sheets comprising wood pulp or other fibrous substances). In further aspects, the pair of wiping elements 14 can comprise polymer. For example, in some optional aspects, the pair of wiping elements 14 can comprise non-woven material (e.g., spunbond, spunlace, meltbond, or any entangled fibers).

In some optional aspects, the pair of wiping elements 14 can be disc-shaped. In further aspects, the wiping elements can be square, rectangular, trapezoidal, oval-shaped or any suitable shape. The wiping surface of each wiping element 14 can have a respective surface area. In some optional aspects, the surface area of each wiping surface can be from about one square centimeter to about eight square centimeters, or from about one square centimeter to about six square centimeters. In some aspects, the wiping elements can be oval-shaped, having a major dimension of 1½ inch and a minor dimension of 1 inch. Optionally, the wiping surface 16 of the pair of wiping elements 14 can have the same surface area. In further aspects, the surface area of the wiping surface of a first wiping element can be different from the surface area of the wiping surface of a second wiping element.

The gripping surface 18 can be configured for a user to grip each wiping element 14 for moving the wiping surface 16 across a lens or other surface for cleaning. For example, the user can grip the first wiping element with a thumb and the second wiping element with a forefinger with the lens in between. The user can then move the first and second wiping elements across the surface of the lens. The gripping surfaces 18 can accordingly be configured to frictionally engage the user's fingers in order to enable the user to move the wiping elements 14 along the surface to be wiped. The gripping surface 18 can comprise a tacky substance on at least a portion of, or, optionally, an entirety of the gripping surface. In some aspects, the tacky substance can comprise, for example, a pressure sensitive adhesive. In some optional aspects, the tacky substance can comprise an elastomer (e.g., acrylic) compounded with a suitable tackifier (e.g., a rosin ester). For example, the tacky substance can comprise a pressure sensitive adhesive. In further aspects, the gripping surface 18 can comprise a textured surface that can engage a finger of a user's hand to improve grip between the user's finger and the gripping surface. In further aspects, the gripping surface 18 can comprise a material (e.g., rubber) that enhances friction with a user's finger.

In some aspects, the tab(s) 19 (e.g., the coupling element 20) can couple to the gripping surface 18 of each wiping element 14. Optionally, the tab(s) 19 (e.g., the coupling element 20) can couple to the gripping surface via the tacky substance.

In some aspects, each wiping element 14 can comprise a backing material 24 (e.g., a polymer sheet) that defines the gripping surface 18. The backing material 24 can couple to a wiping material 26 (e.g., microfiber, paper, woven polymer, nonwoven material, etc.) that defines the wiping surface 16. Optionally, the wiping material can have a thickness from about 1/16 inch to about 3/16 inch, or about 1/16 inch, or from about 1/8 inch to about 3/16 inch. In further aspects, each wiping element 14 can comprise a single material sheet.

Figure 5:
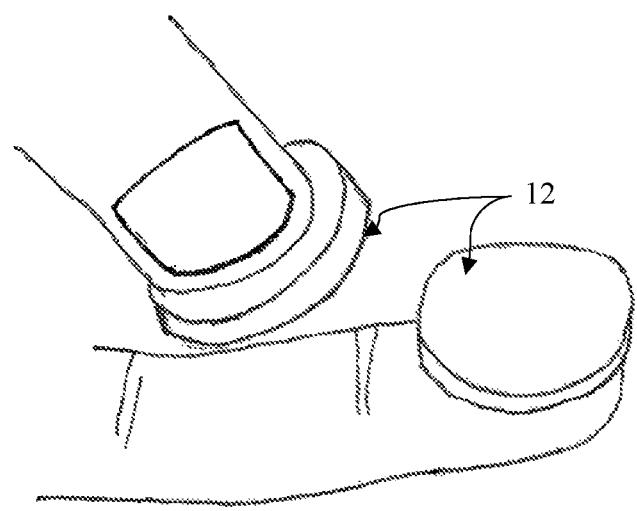
FIG. 5 is a perspective view of the user with the wiping elements adhered to the user's fingertips.

In some optional aspects, the coupling element 20 can comprise widened end portions 30 at the longitudinal ends 22 and a narrow connecting portion 32 that extends between the widened end portions 30. The widened end portions 30 can have an increased width relative to the narrow connecting portion 32 along a transverse axis 6 to provide sufficient surface area for coupling to the wiping elements 14. The wiping elements 14 can have a shape that exposes a sufficient portion of the gripping surface 18 for engaging a user's hand. For example, in some optional aspects, the widened end portions 30 can each have a U-shape. In further aspects, the widened end portions 30 can have cover from about 10% to about 50% of a surface area of the gripping surface. In further exemplary aspects, the widened end portions 30 can be rectangular, semicircular, or any suitable shape. In some optional aspects, the widened end portions 30 can have a perimeter that matches and overlies a perimeter of the respective gripping surface 18. Optionally, the widened end portions 30 can be annular and defining an inner opening in order to expose a portion of the gripping surface 18 through the inner opening. In yet further aspects, the gripping surfaces 18 can be entirely covered, or substantially entirely covered, by the widened end portions 30. In these aspects, the widened end portions 30 can be configured to provide sufficient frictional engagement with the user's fingers to enable a user to move the wiping elements 14 along a surface. For example, the coupling element 20 can be formed from a material having sufficient frictional grip, or a coating can be applied to the coupling element to enhance its grip with the user. Thus, when the connecting portion 22 is torn to separate the wiping elements 14, the outer surfaces of the widened portions 30 can stick to the user's fingers, as shown in FIG. 5.

The apparatus 10 can further comprise packaging 40. In some aspects, the wiping apparatus 12 can be fluidly sealed within the packaging 40. For example, the packaging 40 can be airtight. In this way, the wiping elements 14 can remain moistened. It is contemplated that at the packaging 40 can comprise an inner volume 44 within a circumferential seal 46 around the inner volume. For example, the packaging 40 can comprise opposed laminated sheet portions that are bonded at the circumferential seal 46. The inner volume 44 can be at least partially filled with a liquid or solution as described herein for pre-moistening the wiping apparatus. In further aspects, only the wiping elements 14 are pre-moistened to prevent the liquid or solution from diminishing the tackiness of the gripping surfaces 18. The packaging 40 can comprise a notch, a tear strip, or other feature to facilitate tearing along an opening axis 42. In further aspects, the packaging 40 can comprise an indicator (e.g., a dotted line and/or a scissor icon) indicating an advantageous location on the packaging where a user can cut or tear the packaging. Optionally, the packaging 40 can comprise a liner on the inner surfaces that comprises a non-stick material to enable the wiping assembly 12 to be removed without sticking to the inner surfaces of the packaging. For example, the liner can comprise paraffin wax, soybean wax, or other suitable wax. The liner can also make the packaging 40 moisture resistant. In exemplary aspects, the packaging 40 can comprise laminated polymer and paper or laminated polymer and aluminum.

In some aspects, the narrow connecting portion 32 can define a fold 34. In some optional aspects, the connecting portion 32 can be torn (e.g., at the fold or at line 50 to separate the wiping elements 14.

In exemplary aspects, the tab(s) 19 (e.g., the coupling element 20) can comprise waxed paper. In further aspects, the tab(s) 19 (e.g., the coupling element 20) can comprise a nonstick material (e.g., a nonstick paper or a nonstick polymer material). In further aspects, the tab(s) 19 (e.g., the coupling element 20) can comprise a flexible material that enables twisting about its longitudinal axis 8. In some aspects, the coupling element 20 can have a length from about 2 inches to about four inches, or from about three inches to about four inches.

In exemplary aspects, the coupling element 20 can be non-removably coupled to the wiping elements 14. In further aspects, the coupling element 20 can be removable (e.g., separable) from the wiping elements 14. For example, the coupling element 20 can be adhered to the wiping elements 14 (e.g., via the tacky substance) so that the coupling element can be peeled from the wiping elements. In still further aspects, a portion of the coupling element 20 (e.g., the narrow connecting portion 32, or a portion thereof) can be torn from the wiping elements 14 (e.g., along line 50) to separate the wiping elements, as further illustrated in FIG. 4. In this way, the tab(s) 19 (e.g., the coupling element 20) can be used as a handle for removing the wiping elements 14 from the packaging 40 and then removed to allow for movement between the wiping elements. For example, a user can grip the tab(s) 19 (e.g., the coupling element 20) to pull the wiping assembly 12 from the packaging with a first hand. The user can position a finger and a thumb of a second hand on the gripping surfaces 18 so that the gripping surfaces adhere the finger and thumb to the wiping elements 14. The coupling element 20 can then (with the first hand) be removed (e.g., peeled away) from the wiping elements 14 or torn (e.g., at line 50) in order to allow free movement between the wiping elements that remain adhered to the thumb and finger of the second hand of the user. The wiping assembly 12 can be positioned in the packaging 40 with the tab(s) 19 (e.g., the coupling element 20) extending away from the wiping elements 14 in a direction toward the opening axis 42 so that, when the packaging 40 is opened at the opening axis to form an opening in the package, the coupling element extends toward, and is exposed to, the opening. In this way, the tab(s) 19 (e.g., the coupling element 20) can be presented for gripping once the packaging is opened.

Use of the Wiping Assembly

Figure 3:
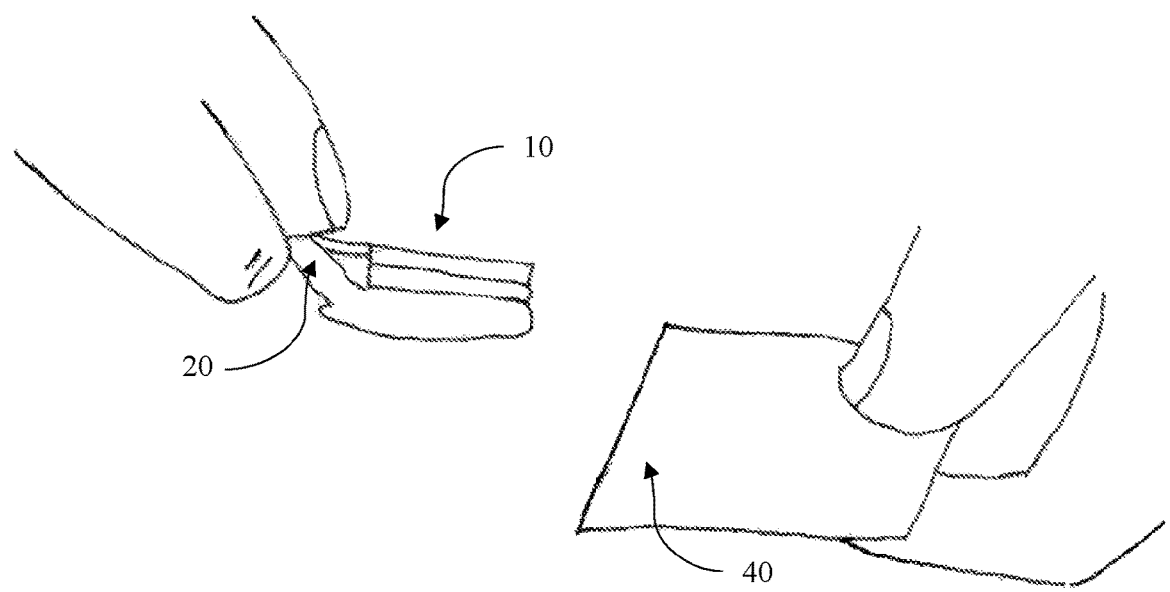
FIG. 3 is a perspective view of a user pulling an apparatus as disclosed herein from a package by gripping a coupling element of the apparatus.
Figure 4:
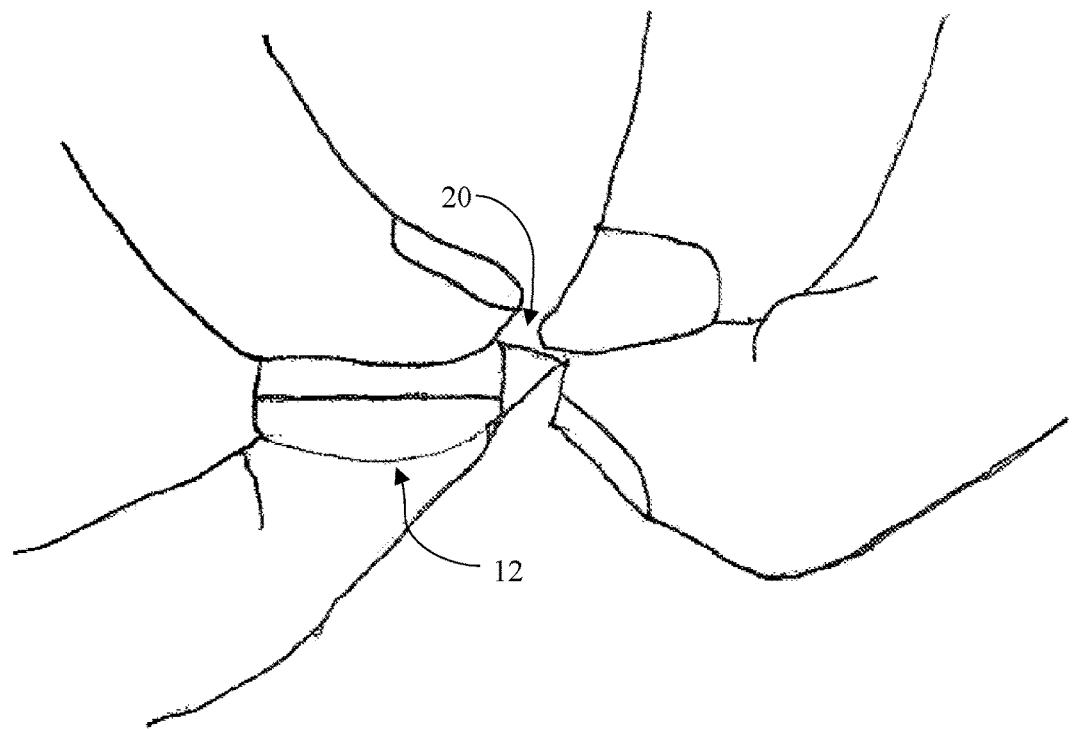
FIG. 4 is a perspective view of the user tearing a portion of the coupling element from wiping elements of the wiping assembly.
Figure 6:
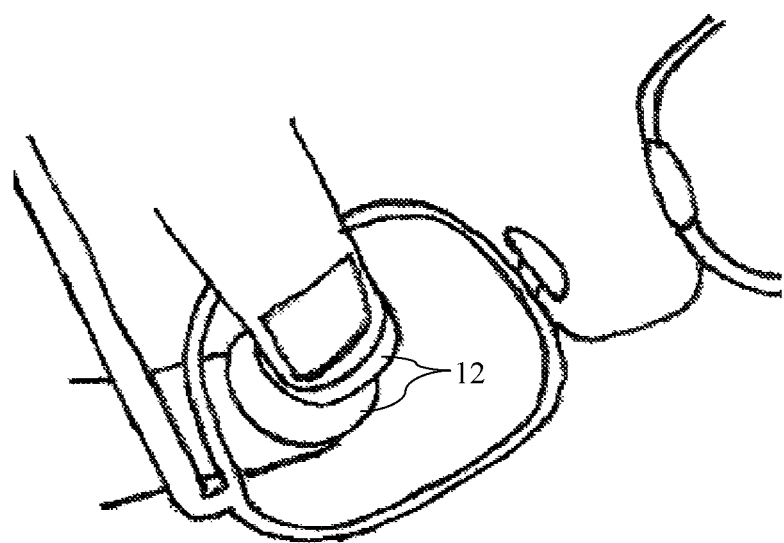
FIG. 6 is a perspective view of the user wiping glasses using the wiping elements.

In exemplary aspects, to use the wiping assembly 12, a user can remove the wiping assembly from the packaging 40. For example, the user can tear the packaging at the opening axis 42 to remove the wiping assembly 12, as illustrated in FIG. 3. The user can then position the wiping elements 14 on opposing surfaces of a lens, shown in FIG. 5. The user can then apply lateral forces to slide each of the wiping elements 14 across the respective opposing surfaces of the lens. For example, the user can position a thumb on the gripping surface 18 of a first wiping element and a forefinger on the gripping surface 18 of a second wiping element, as shown in FIGS. 4-6. The frictional forces between the fingers and gripping surfaces 18 can be greater than the friction between the wiping surfaces 16 and the lens. Thus, the wiping elements can slide against the opposing surfaces of the lens.

In yet further aspects, and as further described herein, the wiping assembly 12 can be used on surfaces other than eyeglass/sunglass lenses, such as screens (e.g., a smartphone screen). For example, the wiping assembly can be placed flat against a surface to be cleaned. Thus, in some aspects, the wiping assembly 12 can be spread so that both wiping surfaces 16 are coplanar and positioned against the surface to be cleaned. The user can position at least one finger against each of the gripping surfaces 18 to cause movement of the wiping elements 14 against the surface.

Optionally, the wiping assembly 12 can be disposed of after use. In further aspects, the wiping assembly 12 can be configured for multiple uses. For example, the packaging 40 can comprise a reusable, resealable bag, such as, for example, a ZIPLOC bag.

In still further aspects, it is contemplated that the wiping assembly 12 can be biodegradable. In further aspects, the packaging 40 can be biodegradable.

The disclosed apparatus 10 can be configured (e.g., sized) to be stored in a purse, wallet, or pocket for easy portability and access. In exemplary aspects, the apparatus can have dimensions of 3 inches or less by 3 inches or less. For example, the apparatus 10 can have dimensions of about 2½" by about 2¾" or about 2½" by about 2½". The apparatus 10 can be configured to remove dust, dirt, soil material, oily, waxy substances, stains (e.g., sebum stains), and fingerprints from surfaces such as eyeglass lenses, sunglass lenses, touch screens, laptop/computer screens, smartphone screens, binocular lenses, camera lenses, etc.

Although the foregoing invention has been described in some detail by way of illustration and example for purposes of clarity of understanding, certain changes and modifications may be practiced within the scope of the appended claims.

What is claimed is:

1. A kit comprising:
    a wiping assembly comprising:
        a pair of wiping elements, each wiping element having a wiping surface and an opposed gripping surface, wherein the pair of wiping elements are arranged with the respective wiping surfaces opposing each other, wherein each wiping element has an outer perimeter, wherein each wiping element comprises a material suitable for removing fingerprints from a glass surface; and
        a coupling element having opposed longitudinal ends, wherein each longitudinal end of the coupling element is coupled to the opposed gripping surface of a respective wiping element of the pair of wiping elements thereby coupling the pair of wiping elements, wherein the coupling element covers only a first portion of the gripping surface of each wiping element of the pair of wiping elements so that a second portion of the gripping surface of each wiping element is exposed for adhering to a finger of a user, wherein the coupling element is provided in a layered relationship with each wiping element of the pair of wiping elements so that the first portion of the coupling element is disposed on the gripping surface of the pair of wiping elements.

2. The kit of claim 1, wherein the pair of wiping elements are pre-moistened.

3. The kit of claim 1, wherein the pair of wiping elements comprise microfiber cloth.

4. The kit of claim 1, wherein the pair of wiping elements are disc shaped.

5. The kit of claim 1, wherein a surface area of the wiping surface of each wiping element is between 1 square centimeter and 8 square centimeters.

6. The kit of claim 1, wherein the coupling element couples to the gripping surface of each wiping element.

7. The kit of claim 1, wherein the coupling element defines a fold between the opposed longitudinal ends.

8. The kit of claim 1, wherein the coupling element comprises a first material, wherein the wiping element comprises a material that is different from the first material.

9. The kit of claim 1, wherein the coupling element has a longitudinal length between the first and second ends, wherein the longitudinal length is between two inches and four inches.

10. The kit of claim 1, wherein the opposed gripping surface of each wiping element comprises a tacky substance.

11. The kit of claim 10, wherein the coupling element couples to each wiping element by the tacky substance.

12. The kit of claim 1, wherein the opposed gripping surface of each wiping element comprise a textured surface.

13. The kit of claim 1, wherein each wiping element comprises a polymer sheet that defines the gripping surface.

14. The kit of claim 1, further comprising a packaging, wherein the wiping assembly is fluidly sealed within the packaging, wherein the respective wiping surfaces of the pair of wiping elements face each other.

15. The kit of claim 14, wherein the packaging comprises opposing sheets that are sealed together at a circumferential seal to define an inner volume, wherein the wiping assembly is disposed within the inner volume.

16. The kit of claim 1, wherein the coupling element covers from 10% to 50% of the gripping surface of each wiping element.

17. The kit of claim 1, wherein the coupling element is configured to be torn.

18. A method of using the kit of claim 1, the method comprising:
    removing the wiping assembly from the packaging;
    tearing the coupling element to decouple the pair of wiping elements;
    positioning the wiping elements on opposing surfaces of a lens; and
    moving, by applying lateral forces against the opposed gripping surfaces of each wiping element, the wiping elements across the respective opposing surfaces of the lens.

* * * * *